(12) United States Patent
Brooks et al.

(10) Patent No.: US 7,467,197 B2
(45) Date of Patent: Dec. 16, 2008

(54) WORKFLOW ANYWHERE: INVOCATION OF WORKFLOWS FROM A REMOTE DEVICE

(75) Inventors: Patrick Joseph Brooks, Toronto (CA); Rhonda L. Childress, Austin, TX (US); Michael John Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 11/039,729

(22) Filed: Jan. 20, 2005

(65) Prior Publication Data

US 2006/0161615 A1    Jul. 20, 2006

(51) Int. Cl.
    *G06F 15/173*    (2006.01)
(52) U.S. Cl. ............... 709/223; 709/217; 709/218; 709/219; 709/224; 709/225; 709/226
(58) Field of Classification Search ......... 709/217–219, 709/223–226
    See application file for complete search history.

(56) References Cited

U.S. PATENT DOCUMENTS

| | | | |
|---|---|---|---|
| 6,111,866 A * | 8/2000 | Kweon et al. ............ 370/335 |
| 6,246,672 B1 | 6/2001 | Lumelsky ............ 370/310 |
| 6,647,272 B1 * | 11/2003 | Asikainen ............ 455/466 |
| 7,024,174 B2 * | 4/2006 | Nagy et al. ............ 455/408 |
| 2001/0042109 A1 | 11/2001 | Bolas et al. ............ 709/219 |
| 2002/0048224 A1 | 4/2002 | Dygert et al. ............ 369/1 |
| 2002/0068559 A1 | 6/2002 | Sharma et al. |
| 2003/0119478 A1 * | 6/2003 | Nagy et al. ............ 455/408 |
| 2003/0233282 A1 | 12/2003 | Ward et al. ............ 705/26 |
| 2004/0042103 A1 | 3/2004 | Mayer ............ 360/7 |

FOREIGN PATENT DOCUMENTS

| WO | 0068824 A1 | 11/2000 |
|---|---|---|
| WO | 02082215 A2 | 10/2002 |

* cited by examiner

*Primary Examiner*—Liangche A Wang
(74) *Attorney, Agent, or Firm*—Duke W. Yee; Libby Z. Handelsman; Mari A. Stewart

(57) ABSTRACT

A method for providing the ability for systems personnel to use a personal wireless device, such as a mobile phone, palm device, or blackberry device, to receive a system alert regarding a developing situation requiring action and to be notified of pre-selected workflows that can resolve the situation prompting the alert. The systems personnel are then able to select a workflow, provide needed parameters, and provide the human approval to execute the workflow. The application packages the information provided by the user into a form usable by the orchestration/provisioning server. The server will perform the requested workflow as if entered on a local console and will respond to the device with a workflow status.

1 Claim, 5 Drawing Sheets

US 7,467,197 B2

WORKFLOW ANYWHERE: INVOCATION OF WORKFLOWS FROM A REMOTE DEVICE

BACKGROUND OF THE INVENTION

1. Technical Field

The present invention generally relates to the automation of computer systems management. More specifically it relates to providing the ability for an administrator to be notified of critical system events via a wireless handheld device and to initiate workflows in response to the events from the wireless device.

2. Description of Related Art

In computer systems management and operations, the current need for on-demand services requires a high degree of flexibility and responsiveness on the part of businesses. To support this environment, the complexity of computer systems has increased dramatically. Management systems are evolving quickly to support computer-assisted monitoring of systems and to initiate pre-determined workflows to provide solutions to needs in a real-time fashion. Management personnel can set up automated workflows and can have the system notify them when it determines that actions are needed to adapt to changing conditions. However, at the same time that these workflows are evolving, personnel are becoming more mobile. There is a great need to oversee these complex systems from a distance without breaching the security of the system.

SUMMARY OF THE INVENTION

An embodiment of the inventive method provides the ability for systems personnel to use a personal wireless device, such as a mobile phone, palm device, or blackberry device, to receive a system alert regarding a developing situation requiring action and to be notified of pre-selected workflows that can resolve the situation prompting the alert. The systems personnel are then able to select a workflow, provide needed parameters, and provide the human approval to execute the workflow. The application will package the information provided by the user into a form usable by the orchestration/provisioning server. The server will perform the requested workflow as if entered on a local console and will respond to the device with a workflow status.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
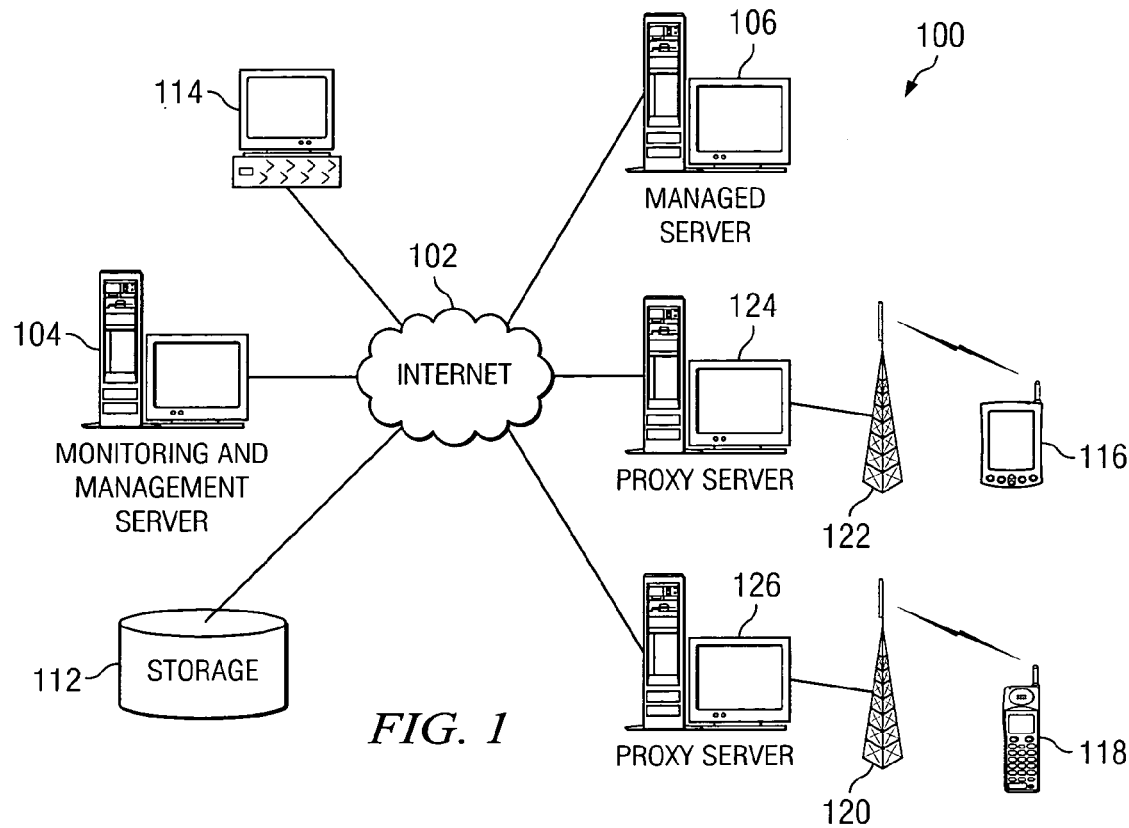
FIG. 1 depicts an overview of a system in which the innovative program can operate.

With reference to FIG. 1, an overview of a system in which the innovative program can operate is shown, according to an exemplary embodiment of the invention. In this embodiment, a network 102, such as the Internet, is used to connect a large number of servers 104, 106, 108, 110, storage devices 112, and individual computers 114. In this embodiment, server 106 is connected to support a website and to serve clients, such as on computer 114. Monitoring and support of the website hosted on server 106 is managed by server 104, which uses a number of monitoring programs to determine where problem situations are beginning to occur and a set of workflows that can be executed to respond to the situations. Mobile devices 116, 118, which can be different types of communications devices, can interface to Internet 102 through their respective wireless base stations 120, 122, which are connected to respective servers 124, 126. Mobile devices 116, 118 can be any type of wireless device, such as a mobile telephone, a personal digital assistant, a blackberry device or a portable computer operating on a short-range wireless network, while the wireless base station can be any of the base stations that support these types of devices. Once connected through wireless base stations 120, 122 and servers 124, 126, mobile devices 116, 118 can access connections on the Internet 102, such as servers 104, 106, and computer 114.

Figure 2:
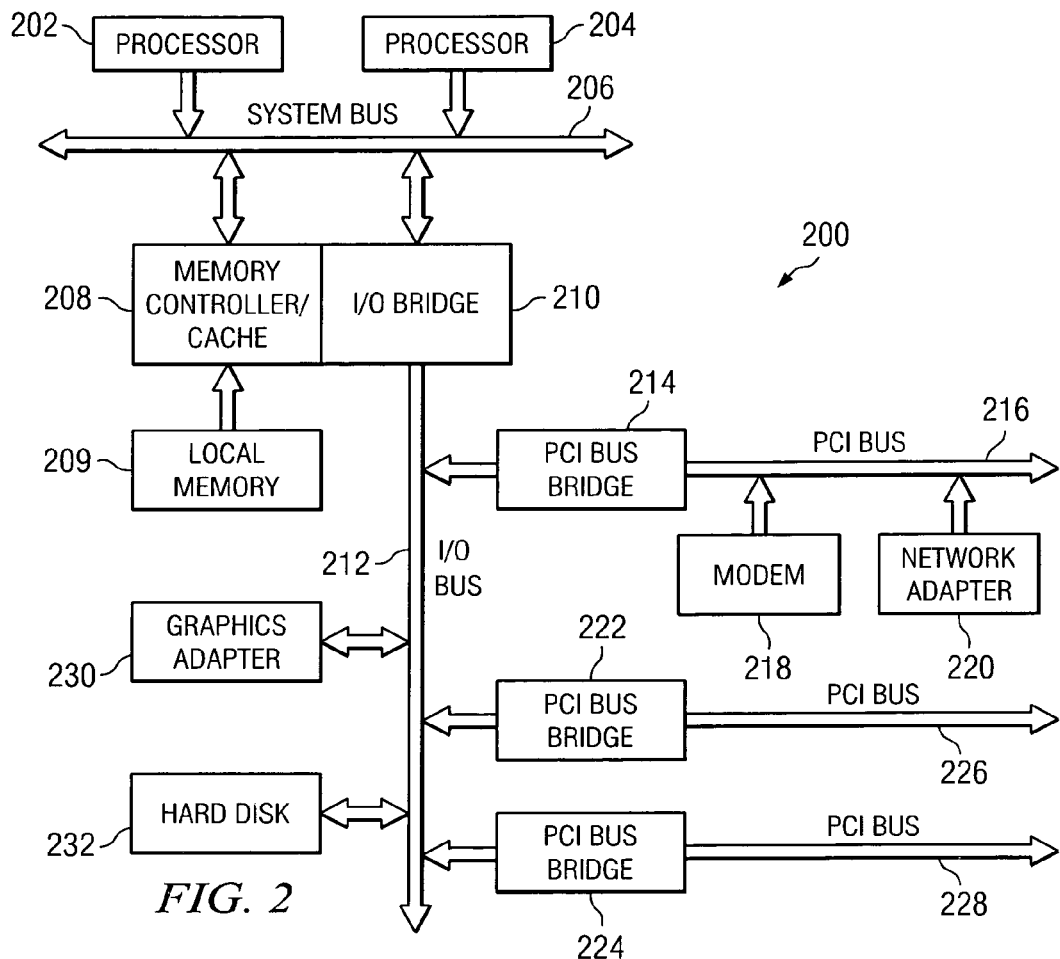
FIG. 2 an exemplary block diagram of a data processing system that may be implemented as a server on which the server portion of the invention program is run, according to an illustrative embodiment of the invention.

Referring to FIG. 2, a block diagram of a data processing system that may be implemented as a server, such as servers 104, 106, 124, 126 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
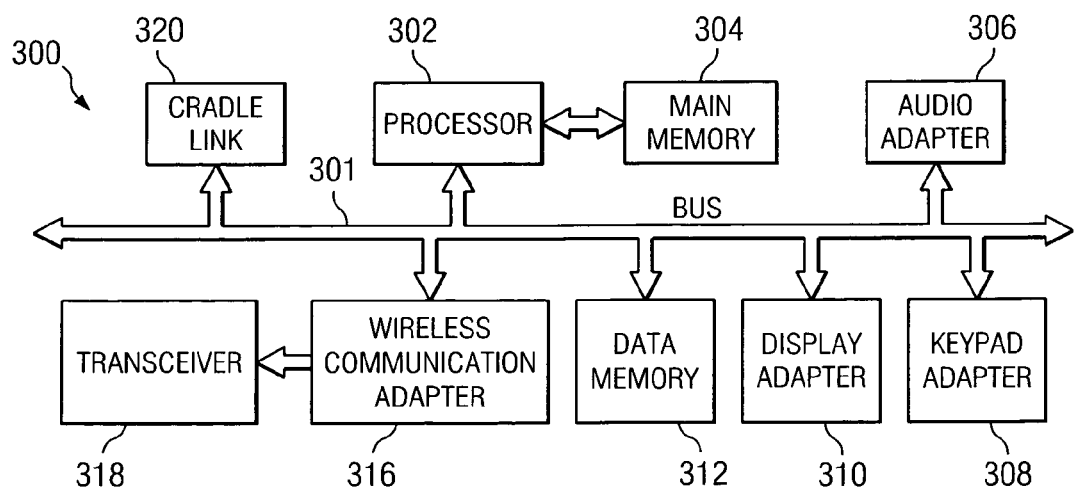
FIG. 3 depicts an exemplary block diagram of a wireless device on which the user portion of the disclosed program is run, according to an exemplary embodiment of the invention.

Turning now to FIG. 3, a block diagram of a wireless device is shown in accordance with a preferred embodiment of the present invention. Wireless device 300 is exemplary of a device in which code or instructions implementing the processes of the present invention may be located. Wireless device 300 includes a bus 301 to which processor 302 and main memory 304 are connected. Audio adapter 306, keypad adapter 308, display adapter 310, data memory 312, and wireless communication adapter 316 are also connected to bus 306. Wireless communications adapter 316 uses transceiver 318 to interface with a remote service, such as with wireless base stations 120, 122 of FIG. 1. Cradle link 320 provides a mechanism to connect device 300 to a cradle used in synchronizing data with another data processing system. Further, display adapter 310 also includes a mechanism to receive user input from a stylus when a touch screen display is employed.

An operating system runs on processor 302 and is used to coordinate and provide control of various components within device 300. The operating system may be, for example, a commercially available operating system such as Windows CE, which is available from Microsoft Corporation. Instructions for the operating system and applications or programs are located on storage devices, such as data memory 312, and may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3.

Figure 4:
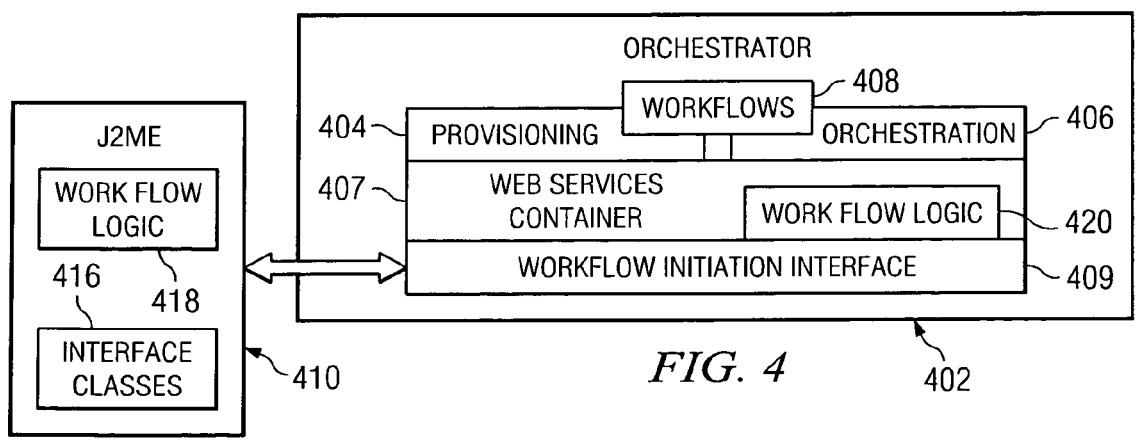
FIG. 4 depicts a high-level diagram of the components of the application, according to an exemplary embodiment of the invention.

With reference now to FIG. 4, a high-level diagram of the components of the application is presented according to an exemplary embodiment of the invention. Orchestrator 402 can run on a server or group of servers, such as server 104 in FIG. 1. Orchestrator 402 is a resource management program that automates the management of data centers. Using an automated, policy-based framework, orchestrator 402 can dynamically reallocate and configure data center resources to respond to traffic demands of specified applications. Orchestrator 402 contains separate programs for provisioning 404 and orchestration 406, with pre-defined workflows 408 which can perform specific tasks of provisioning and orchestration. In this application, workflows are defined as a series of one or more commands that when executed will carry out a process, such as allocating and configuring a server. Within orchestrator 402, modules for provisioning 404 and orchestration 406 interact with a web services container 407. A workflow initiation module 409 provides a protocol through which a user can manipulate complex systems using an interactive access model, such as Simple Object Access Protocol (SOAP), which allows drag-and-drop manipulations of graphical user interfaces (GUIs). In the prior art, an orchestrator 402 would interact with administrators through a console, requiring an on-site presence to provide the authorization for performing suggested workflows.

Within the mobile device used to access the innovative method, a small computer application, such as Java 2 Micro-Edition (J2ME) 410 provides the structural interface for the inventive program; J2ME contains SOAP classes 416. The innovative program has one section of workflow anywhere logic 418 that resides on the wireless device containing J2ME 410 and a second section of workflow anywhere logic 420 that reside in web services container 407 within orchestrator 402. In this embodiment, communications between J2ME 410 and orchestration module 402 are formatted according to SOAP/HTTP. One of ordinary skill in the art would understand that workflow logic 420 can alternatively be a stand-along program or can be included within other specific software on the server, while workflow logic 418 can also reside in other components on the wireless device, as long as the wireless device and the server are connected to communicate with each other.

Figure 5A:
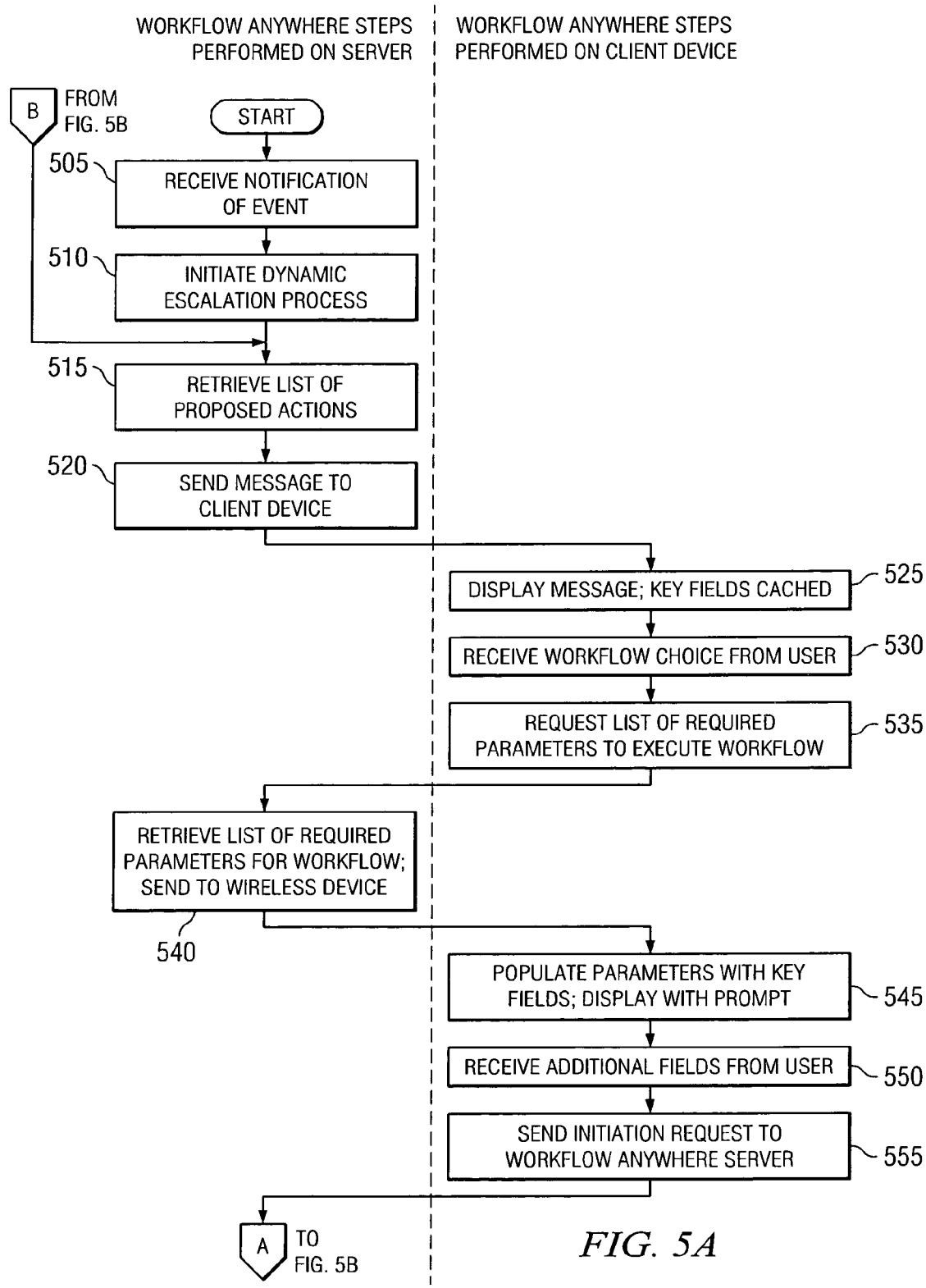
FIGS. 5A and 5B form a single flowchart of the actions performed by the server and wireless device, according to an embodiment of the present invention.
Figure 5B:
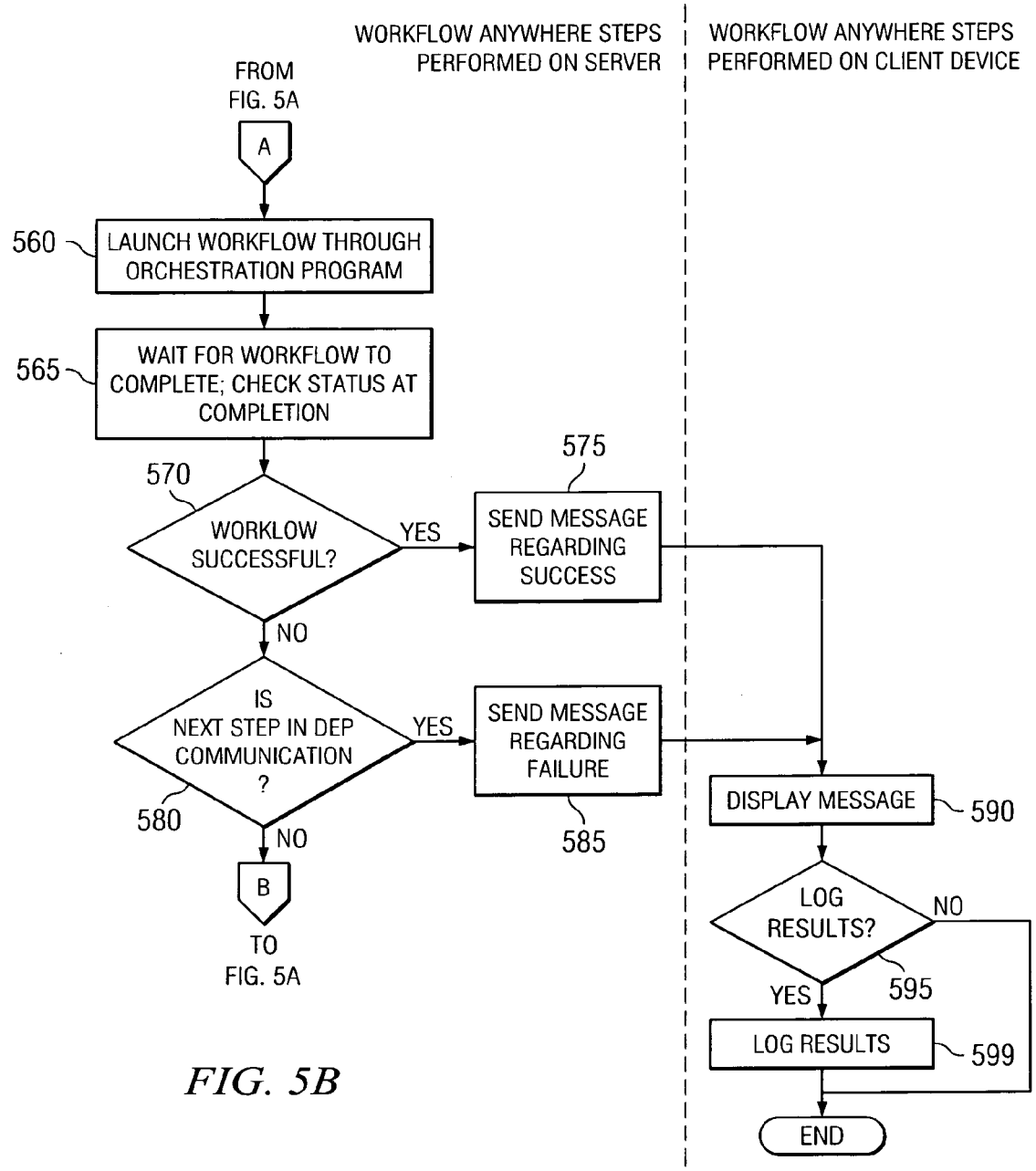

With reference to FIG. 5, we can see a flowchart of the steps taken by the innovative program. Those steps shown on the left-hand side of the page are performed by workflow-anywhere logic 420 on the server, while steps shown on the right-hand side of the page are performed by workflow-anywhere logic 418 on the handheld device.

The flowchart begins with the server receiving a notification of an event (step 505). A monitoring program that has detected an event, such as the passing of a threshold, will send the notification. For example, in a website that has a usage rate that varies dramatically, the website may be configured to run on a single cluster of two servers during low usage times of day, but to have access to additional servers that can be configured and brought into the cluster at peak times. The monitoring program can watch key indicators, such as number of current users or percent usage of processing capabilities, with specified levels triggering notifications. Once the notification is received, the inventive program will initiate a dynamic escalation process (DEP) (step 510). A DEP is a process designed to drive the resolution of the problem and can consist, for example, of initiating a corrective action workflow, with a failure of the corrective action causing the initiation of communications for further instructions. The remaining steps shown in the server side of the workflow-anywhere process are all part of the DEP. The program retrieves a list of proposed actions, such as workflows that can be used to resolve the specific problem (step 515). In the example above, the usage level on the server cluster has passed a trigger point. Exemplary workflow choices may be to (a) add another server to the existing cluster or (b) add another cluster containing a given number of servers. The notification of the original event and the list of proposed responses are then formulated into a message and sent to the wireless device (step 520). The specific format in which the message is sent can be implementation specific. It can use, for example, email, instant messaging (IM), Short Message Service (SMS), etc. If desired, the message can be encrypted in a format that can be decrypted at the user device. The DEP or a file accessible by the DEP will contain the device address or phone number to which the message should be sent.

Figure 6A:
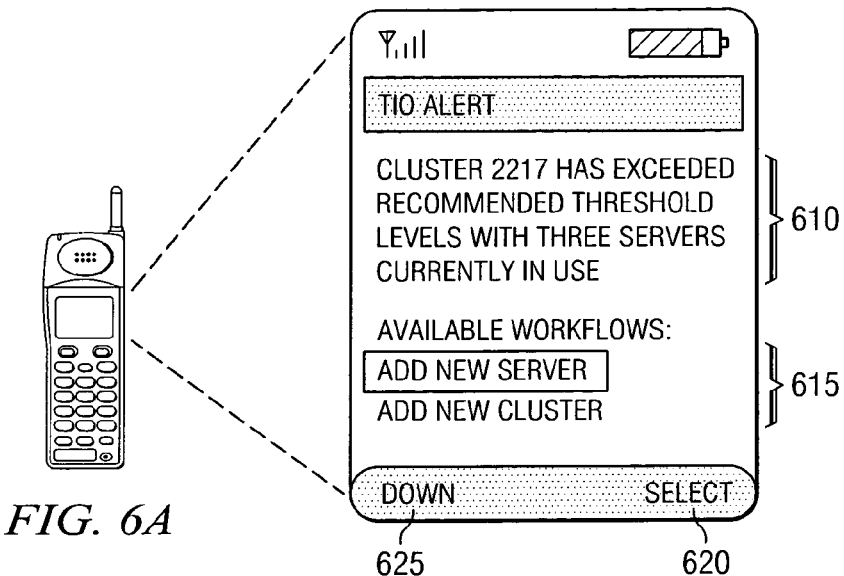
FIGS. 6A-6C depict a series of screens on a wireless device on which the innovative application is running, according to an exemplary embodiment of the invention.

On the wireless device, the message is received and displayed, while key fields from the event are cached for future use, as will be explained later (step 525). The key fields in this example might be the identification of the cluster involved in the event, the usage level, etc. The display will generally contain not only a notification of the event, but will also present either the list of workflows to correct the problem or a pointer to the list. The act of displaying the message is preferably also accompanied by an audible or tactile alert, such as a ringing tone or vibration to alert the user that such an event has occurred. FIG. 6A is an exemplary screen for an event notification such as in the example above and will be discussed in greater detail below.

Once the information has been displayed to the user, the program necessarily waits for user input. When the user chooses a workflow, they will enter their choice using a keypad, scrolling buttons, stylus, etc. and the innovative program receives the workflow choice (step 530). At this point, the program knows the workflow that should be performed; what it needs is to formulate the request in such a way that the server side of the program can carry it out. The device logic will request a list of parameters that are necessary for this particular workflow from the server logic (step 535). This list is preferably retrieved from a database that is available to the server and forwarded to the wireless device (step 540). The wireless device receives the required parameters and displays these parameters for the user. At the same time, default values and the key fields that were cached from the original alert are used to populate appropriate values in the parameters (step 545). In instances where only one workflow can be chosen in response to the event, steps 520-545 can be combined into a fewer number of steps, with the initial message showing both the event and the workflow to be started. The user will then change or add any needed values, including a password to verify that the user is administratively empowered to make this decision (step 550). Authorization can be initially presumed from possession of the device that is sent the message, but is preferably verified by knowledge of a password to prevent unauthorized access if the device is lost. Other security measures can also be implemented in addition to the use of a password. For example, Secure Sockets Layer (SSL) can be used for encryption when sending messages, especially the authorization to the workflow server. The workflow request is then sent to the server side of the program (step 555). There, the program will verify authorization, receive the parameters and send appropriate messages to initiate the appropriate workflow (step 560). Once the message is sent, the program goes into a waiting mode for this particular workflow, until such time as it is notified of the completion of the workflow (step 565). Once notified, the program determines whether or not the workflow was successful in completing its task (step 570). If the workflow completed successfully, the program sends a completion message (step 575); if not, the program must determine the next step in the DEP (Dynamic Escalation Process); generally, the next step will be either another workflow or a message to be sent (step 580). If the next step is a message, a message noting the failure of the previous workflow is sent to the device (step 585); otherwise, the process returns to step 515 and proceeds from there. Whatever the message the server sends to the device, the appropriate message is received and displayed for the user (step 590). If a failure is reported, the user may be prompted to perform other actions outside the bounds of the innovative program. In any case, the program will ask the user if they wish to log the current event and response (step 595). If desired, the action is logged (step 599) and in either case, the process is completed.

Figure 6B:
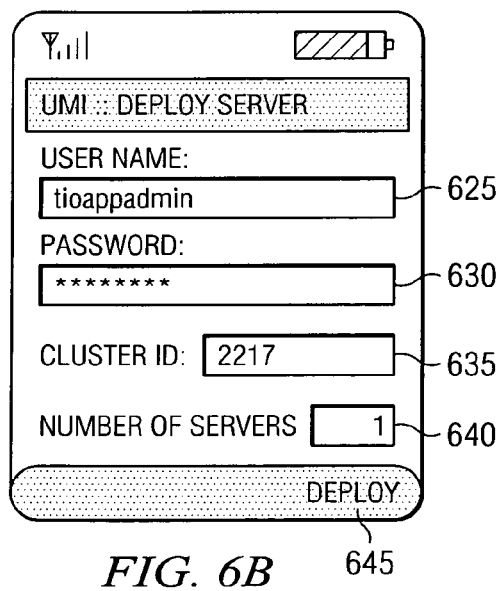
Figure 6C:
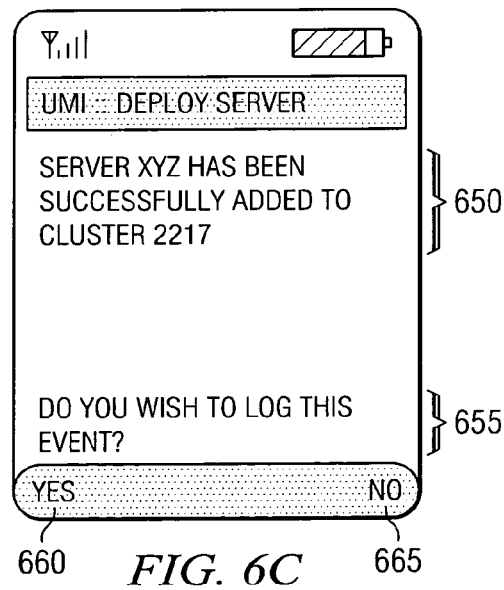

With reference to FIGS. 6A-C, a series of exemplary screens are shown that show the presentation of the innovative program on a wireless device, according to an embodiment of the invention. In the screen of FIG. 6A, the notification of a triggering event is presented, along with a list of choices to respond to the event. According to the example presented above, cluster 2217, which supports a customer website, is beginning to receive heavier usage, as is usual for this time of day. A message is sent to the system administrator on his mobile phone. A first part of message 610 describes the situation that has occurred. The available workflows 615 to resolve this problem are then shown, with the first workflow, to add a new server, indicated by an enclosing box. Two prompts for buttons on the phone allow the user to move the highlighted area down 625 and to select 620 the highlighted workflow. The second screen, in FIG. 6B, shows that the workflow to add a server has been chosen. Four parameters are needed to initiate the workflow: user name 625, password 630, cluster identification 635, and number of servers to add 640. Of these parameters, the user name 625 can be automatically populated from the logic either on the phone or the server; while values are populated for the cluster ID 630 and the number of servers 635 from the original alert message and a default value respectfully. The user only needs to fill in their password 630 and, if desired, change the number of servers to add. The user then uses the button indicated near the prompt to 'deploy' 645 to initiate the process. In the final screen of FIG. 6C, the workflow has completed and a notification displayed that a server has successfully been added 650. The user is also asked whether or not to log the event 655, with prompts given at separate buttons for 'yes' 660 and 'no' 665. Of course, these displays are only exemplary and can take many different forms. For example, on devices where a stylus is used, icons can be presented for drag-and-drop operations or other known variations on presentations. The possibilities are limited only by the capabilities of the device itself and the imagination of the designer.

As shown in this exemplary embodiment, management of a complex system can be managed in a timely manner from a wireless device, with no loss of security. Given that handheld devices are small enough to be carried anywhere at any time, an administrator can be freed from the necessity of remaining in the vicinity of a direct console and allowed to roam where needed while remaining in touch with the necessary procedures of the system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of managing a computer system, comprising the computer-initiated steps:

responsive to a detecting that a usage rate associated with a server cluster exceeds a threshold level of usage, sending a notification of a triggering event, wherein the usage rate is at least one of a number of current users and a percentage usage of processing capabilities of the data processing system and wherein the triggering event is the usage rate exceeding the threshold level of usage;

receiving the notification from the monitoring program, wherein the notification provides notice of the triggering event;

sending a first message regarding the triggering event and a plurality of proposed workflows to a wireless device for display to a system administrator associated with said mobile telephone, wherein a workflow is a series of one or more commands that carry out a process to add at least one additional server to the server cluster in response to the triggering event, wherein said first message is accompanied by at least one of an audible alert or a tactile alert to alert said system administrator that the triggering event occurred;

responsive to receiving a choice of one of said plurality of proposed workflows chosen by said system administrator, providing a list of parameters necessary to run said chosen one of said plurality of proposed workflows to the wireless device, wherein the wireless device displays the list of parameters to the system administrator;

responsive to an instruction to launch said chosen one of said proposed workflows being received accompanied by said list of parameters populated by associated values and an authorized system administrator name and password, causing said chosen one of said proposed workflows to be launched;

responsive to said chosen one of said proposed workflows completing successfully, sending a second message indicating that said chosen one of said proposed workflows completed successfully; and responsive to said chosen one of said proposed workflows not completing successfully, presenting a second proposed workflow on said mobile telephone for approval by said system administrator.

* * * * *